(12) United States Patent
Avagyan et al.

(10) Patent No.: US 11,720,412 B2
(45) Date of Patent: Aug. 8, 2023

(54) HIGH AVAILABILITY MULTI-SINGLE-TENANT SERVICES

(71) Applicant: Google LLC, Mountain View, CA (US)

(72) Inventors: Grigor Avagyan, Kirkland, WA (US); Dean Hildebrand, Mountain View, CA (US)

(73) Assignee: Google LLC, Mountain View, CA (US)

( * ) Notice: Subject to any disclaimer, the term of this patent is extended or adjusted under 35 U.S.C. 154(b) by 402 days.

(21) Appl. No.: 16/976,999

(22) PCT Filed: Mar. 1, 2018

(86) PCT No.: PCT/US2018/020352
§ 371 (c)(1),
(2) Date: Aug. 31, 2020

(87) PCT Pub. No.: WO2019/168532
PCT Pub. Date: Sep. 6, 2019

(65) Prior Publication Data
US 2021/0004275 A1    Jan. 7, 2021

(51) Int. Cl.
*G06F 9/50* (2006.01)
*G06F 9/455* (2018.01)
*G06F 11/34* (2006.01)

(52) U.S. Cl.
CPC ........ *G06F 9/5077* (2013.01); *G06F 9/45558* (2013.01); *G06F 9/5027* (2013.01);
(Continued)

(58) Field of Classification Search
None
See application file for complete search history.

(56) References Cited

U.S. PATENT DOCUMENTS 7,313,637 B2 * 12/2007 Tanaka ............... G06F 11/1484
710/18
9,110,693 B1 * 8/2015 Meiri .................... G06F 9/4856
(Continued)

FOREIGN PATENT DOCUMENTS

WO    2015077756 A1    5/2015

OTHER PUBLICATIONS

Fan e tal; "Availability-aware Mapping of Service Function Chains" IEEE 2017; (Fan_2017.pdf; pp. 1-9) (Year: 2017).*
(Continued)

*Primary Examiner* — Hiren P Patel
(74) *Attorney, Agent, or Firm* — Honigman LLP; Brett A. Krueger

(57) ABSTRACT

A method (400) of maintaining availability of service instances (362) on a distributed system (200) includes executing a pool of primary virtual machine (VM) instances (350P), each primary VM instance executing a corresponding individual service instance and including a rate of unavailability. The method also includes determining a number of secondary VM instances (350S) required to maintain availability of the individual service instances when one or more of the primary VM instances are unavailable based on the number of primary VM instances in the pool of primary VM instances and the rate of unavailability. The method also includes instantiating a pool of secondary VM instances based on the number of secondary VM instances required to maintain availability of the individual service instances.

26 Claims, 5 Drawing Sheets

(52) U.S. Cl.
CPC .............. *G06F 11/3409* (2013.01); *G06F 2009/45575* (2013.01); *G06F 2009/45583* (2013.01); *G06F 2009/45595* (2013.01); *G06F 2209/503* (2013.01); *G06F 2209/5011* (2013.01)

(56) References Cited

U.S. PATENT DOCUMENTS

| | | | |
|---|---|---|---|
| 9,223,623 B2* | 12/2015 | Gujarathi | G06F 16/00 |
| 9,268,642 B2* | 2/2016 | Krishnan | G06F 11/1415 |
| 9,424,152 B1* | 8/2016 | Raut | G06F 11/2041 |
| 9,600,380 B2* | 3/2017 | Mizuno | G06F 11/1438 |
| 9,747,126 B2* | 8/2017 | Anglin | G06F 9/5011 |
| 9,766,989 B2* | 9/2017 | Mitkar | G06F 9/5077 |
| 9,798,635 B2* | 10/2017 | Harper | G06F 9/4856 |
| 9,996,440 B2* | 6/2018 | Ganesan | G06F 11/2017 |
| 10,129,106 B2* | 11/2018 | Cropper | H04L 41/5054 |
| 10,417,102 B2* | 9/2019 | Sanakkayala | H04L 43/10 |
| 10,628,195 B2* | 4/2020 | Miller | H04L 41/0896 |
| 10,949,241 B2* | 3/2021 | Hildebrand | G06F 9/5022 |
| 2014/0007097 A1* | 1/2014 | Chin | G06F 9/5077 718/1 |
| 2014/0281288 A1 | 9/2014 | Nayar et al. | |
| 2016/0103698 A1* | 4/2016 | Yang | G06F 11/1658 718/1 |
| 2016/0299772 A1* | 10/2016 | Seenappa | H04L 41/0806 |
| 2016/0306646 A1 | 10/2016 | Lao et al. | |
| 2016/0335111 A1* | 11/2016 | Bruun | H04L 41/50 |
| 2017/0116020 A1* | 4/2017 | Miller | H04L 41/0896 |
| 2018/0276024 A1* | 9/2018 | He | G06F 9/45508 |
| 2019/0188022 A1* | 6/2019 | Jung | G06F 9/45558 |
| 2021/0144056 A1* | 5/2021 | Chakrapani Rangarajan | H04L 41/5012 |

OTHER PUBLICATIONS

Li et al; "Optimizing Backup Resources in the Cloud", IEEE 2016; (Li_2016.pdf; pp. 790-797) (Year: 2016).*

Son et al.; "Protego: Cloud-Scale Multitenant IPsec Gateway"; 2017 USENIX Annual Technical Conference (USENIX ATC '17); (Son_2017.pdf; pp. 473-485) (Year: 2017).*

Undheim et al.; "Differentiated Availability in Cloud Computing SLAs"; IEEE 2011; (Undheim_2011.pdf; pp. 1-8) (Year: 2011).*

Fan Jingyuan "Carrier-grade avaliibility-award mapping of Service Function Chains with on-side backups", Jun. 14, 2017, pp. 1-10.

International Search Report and Written Opininon for the Application No. PCT/US2018/020352 dated Nov. 16, 2018.

IP India, Examination Report for Application 202047037617, dated Dec. 22, 2021.

* cited by examiner

HIGH AVAILABILITY MULTI-SINGLE-TENANT SERVICES

TECHNICAL FIELD

This disclosure relates to multi-single-tenant services with high availability.

BACKGROUND

Multi-single-tenant (MST) services execute software/service instances on virtual machines. In single tenancy, each instance executes on a separate virtual machine. When a virtual machine fails, or is otherwise unavailable for a time period for updates or maintenance, the service executing on that virtual machine may transfer and execute on a secondary virtual machine. Delays may occur in generating a secondary virtual machine when there is a lack of capacity in a computing environment. As a result, it is known to allocate one secondary virtual machine for each primary virtual machine so that the MST service can responsively failover to a secondary virtual machine without delay for executing a software instance associated with a primary virtual machine that has become unavailable due to failure, maintenance/updates, or other reason. MST services using a large number of virtual machines, however, utilize a large amount of resources to allocate and maintain availability of the corresponding virtual machines that generally lie idle for a majority of time.

SUMMARY

One aspect of the disclosure provides a method of maintaining availability of service instances on a distributed system. The method includes executing, by data processing hardware of the distributed system, a pool of primary virtual machine (VM) instances, each primary VM instance executing a corresponding individual service instance and including a rate of unavailability. The method also includes determining, by the data processing hardware, a number of secondary VM instances required to maintain availability of the individual service instances when one or more of the primary VM instances are unavailable based on the number of primary VM instances in the pool of primary VM instances and the rate of unavailability. The method also includes instantiating, by the data processing hardware, a pool of secondary VM instances based on the number of secondary VM instances required to maintain availability of the individual service instances.

Implementations of the disclosure may include one or more of the following optional features. In some implementations, the method also includes identifying, by the data processing hardware, unavailability of one of the primary VM instances in the pool of primary VM instances and causing, by the data processing hardware, the unavailable primary VM instance to failover to one of the secondary VM instances in the pool of secondary VM instances to commence executing the individual service instance associated with the unavailable primary VM instance. In these implementations, the method may also include determining, by the data processing hardware, that the secondary VM instance includes a corresponding resource level that is less than a target resource level associated with the corresponding individual service instance; and during execution of the individual service instance by the secondary VM instance, growing, by the data processing hardware, the corresponding resource level of the secondary VM instance until the target resource level associated with the individual service instance is satisfied. In some examples, a number of secondary VM instances in the pool of secondary VM instances is less than the number of primary VM instances in the pool of primary VM instances. Optionally, each primary VM instance may execute multiple primary containers and each primary container executes a corresponding individual service instance in a secure execution environment isolated from the other primary containers.

In some examples, the method also includes updating, by the data processing hardware, the number of secondary VM instances required to maintain availability of the individual service instances when the number of primary VM instances executing in the pool changes. Unavailability of a primary instance may be based upon at least one of a failure of the primary VM instance, a delay in re-creating the primary VM instance, or a planned maintenance time period for the primary VM instance. Moreover, the rate of unavailability may include at least one of a frequency of unavailability or a period of unavailability.

In some implementations, the method also includes determining, by the data processing hardware, the rate of unavailability of each primary VM instance in the pool of primary VM instances based on a mean-to-failure (MTTF) and an expected length of time to re-create the corresponding VM instance. Instantiating the pool of secondary VM instances may include determining a corresponding VM type for each primary VM instance in the pool of primary VM instances, and, for each different VM type in the pool of primary VM instances, instantiating at least one secondary VM instance having the same VM type. In some examples, the corresponding VM type for each primary VM instance indicates at least one of memory resource requirements, computing resource requirements, network specification requirements, or local storage requirements for the corresponding VM instance.

In some examples, the method also includes receiving, at the data processing hardware, a planned failover message indicating a number of primary VM instances in the pool of primary VM instances that will be unavailable during a planned maintenance time period. In these examples, instantiating the pool of secondary VM instances is further based on the number of primary VM instances that will be unavailable during the planned maintenance time period. For instance, instantiating the pool of secondary VM instances may include instantiating a number of secondary VM instances equal to the greater one of: the number of secondary VM instances required to maintain availability of the individual service instances; or the number of primary VM instances that will be unavailable during the planned maintenance time period. The pool of secondary VM instances may be instantiated for use by a single customer of the distributed system. Optionally, the pool of secondary VM instances may be instantiated for use by multiple customers of the distributed system.

The above aspects may be applied to the multi-single-tenant services described above. In such a case, each individual service instance may execute on a separate virtual machine instance. Similarly, the aspects above may be applied when each of the primary service instances are running in a container, such that the primary service instance fails over to a secondary container rather than a full virtual machine instance. Multiple containers may run in a single VM. A method based on this aspect may provide a method of maintaining availability of service instances on a distributed system, the method including: executing, by data processing hardware of the distributed system, a primary virtual machine (VM) instance, the primary VM instance executing a pool of primary containers. Each primary container executing a corresponding individual service instance and including a rate of unavailability. The method also includes determining, by the data processing hardware, a number of secondary containers required in a secondary VM instance to maintain availability of the individual service instances when one or more of the primary containers are unavailable based on the number of primary containers in the pool of primary containers and the respective rate of unavailability; and instantiating, by the data processing hardware, a pool of secondary containers on a secondary VM instance based on the number of secondary containers required.

Moreover, the aspects above may be applied to bare metal machines (e.g., bare metal servers) instead of VM instances. For instance, single-tenant, bare metal servers can provide different options to some organizations there are restricted by compliance measures, such as data security and privacy controls. A method based on this aspect may provide a method of maintaining service instances on a distributed system, the method including, executing, a pool of primary bare metal machines, each primary bare metal machine executing a corresponding individual service instance and including a rate of unavailability. The method also includes determining, by the data processing hardware, a number of secondary bare metal machines required to maintain availability of the individual service instances when one or more of the primary bare metal machines are unavailable based on the number of primary bare metal machines in the pool of primary bare metal machines and the rate of unavailability. The method also includes instantiating, by the data processing hardware, a pool of secondary bare metal machines based on the number of secondary bare metal machines required to maintain availability of the individual service instances.

Another aspect of the disclosure provides a system for maintaining availability of service instances on a distributed system. The system includes data processing hardware and memory hardware in communication with the data processing hardware. The memory hardware stores instructions that when executed on the data processing hardware cause the data processing hardware to perform operations including executing a pool of primary virtual machine (VM) instances. Each primary VM instance executes a corresponding individual service instance and includes a rate of unavailability. The operations also include determining a number of secondary VM instances required to maintain availability of the individual service instances when one or more of the primary VM instances are unavailable based on the number of primary VM instances in the pool of primary VM instances and the rate of unavailability. The operations also include instantiating a pool of secondary VM instances based on the number of secondary VM instances required to maintain availability of the individual service instances.

This aspect may include one or more of the following optional features. For instance, the operations may optionally include identifying unavailability of one of the primary VM instances in the pool of primary VM instances, and causing the unavailable primary VM instance to failover to one of the secondary VM instances in the pool of secondary VM instances to commence executing the individual service instance associated with the unavailable primary VM instance. Additionally, the operations may further include determining that the secondary VM instance includes a corresponding resource level that is less than a target resource level associated with the corresponding individual service instance; and during execution of the individual service instance by the secondary VM instance, growing the corresponding resource level of the secondary VM instance until the target resource level associated with the individual service instance is satisfied. In some examples, a number of secondary VM instances in the pool of secondary VM instances is less than the number of primary VM instances in the pool of primary VM instances. Optionally, each primary VM instance may execute multiple primary containers and each primary container executes a corresponding individual service instance in a secure execution environment isolated from the other primary containers.

In some examples, the operations also include updating the number of secondary VM instances required to maintain availability of the individual service instances when the number of primary VM instances executing in the pool changes. Unavailability of a primary instance may be based upon at least one of a failure of the primary VM instance, a delay in re-creating the primary VM instance, or a planned maintenance time period for the primary VM instance. Moreover, the rate of unavailability may include at least one of a frequency of unavailability or a period of unavailability.

In some implementations, the operations also include determining the rate of unavailability of each primary VM instance in the pool of primary VM instances based on a mean-time-to-failure (MTTF) and an expected length of time to re-create the corresponding VM instance. Instantiating the pool of secondary VM instances may include determining a corresponding VM type for each primary VM instance in the pool of primary VM instances, and, for each different VM type in the pool of primary VM instances, instantiating at least one secondary VM instance having the same VM type. In some examples, the corresponding VM type for each primary VM instance indicates at least one of memory resource requirements, computing resource requirements, network specification requirements, or local storage requirements for the corresponding VM instance.

In some examples, the operations also include receiving a planned failover message indicating a number of primary VM instances in the pool of primary VM instances that will be unavailable during a planned maintenance time period. In these examples, instantiating the pool of secondary VM instances is further based on the number of primary VM instances that will be unavailable during the planned maintenance time period. For instance, instantiating the pool of secondary VM instances may include instantiating a number of secondary VM instances equal to the greater one of: the number of secondary VM instances required to maintain availability of the individual service instances; or the number of primary VM instances that will be unavailable during the planned maintenance time period. The pool of secondary VM instances may be instantiated for use by a single customer of the distributed system. Optionally, the pool of secondary VM instances may be instantiated for use by multiple customers of the distributed system.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
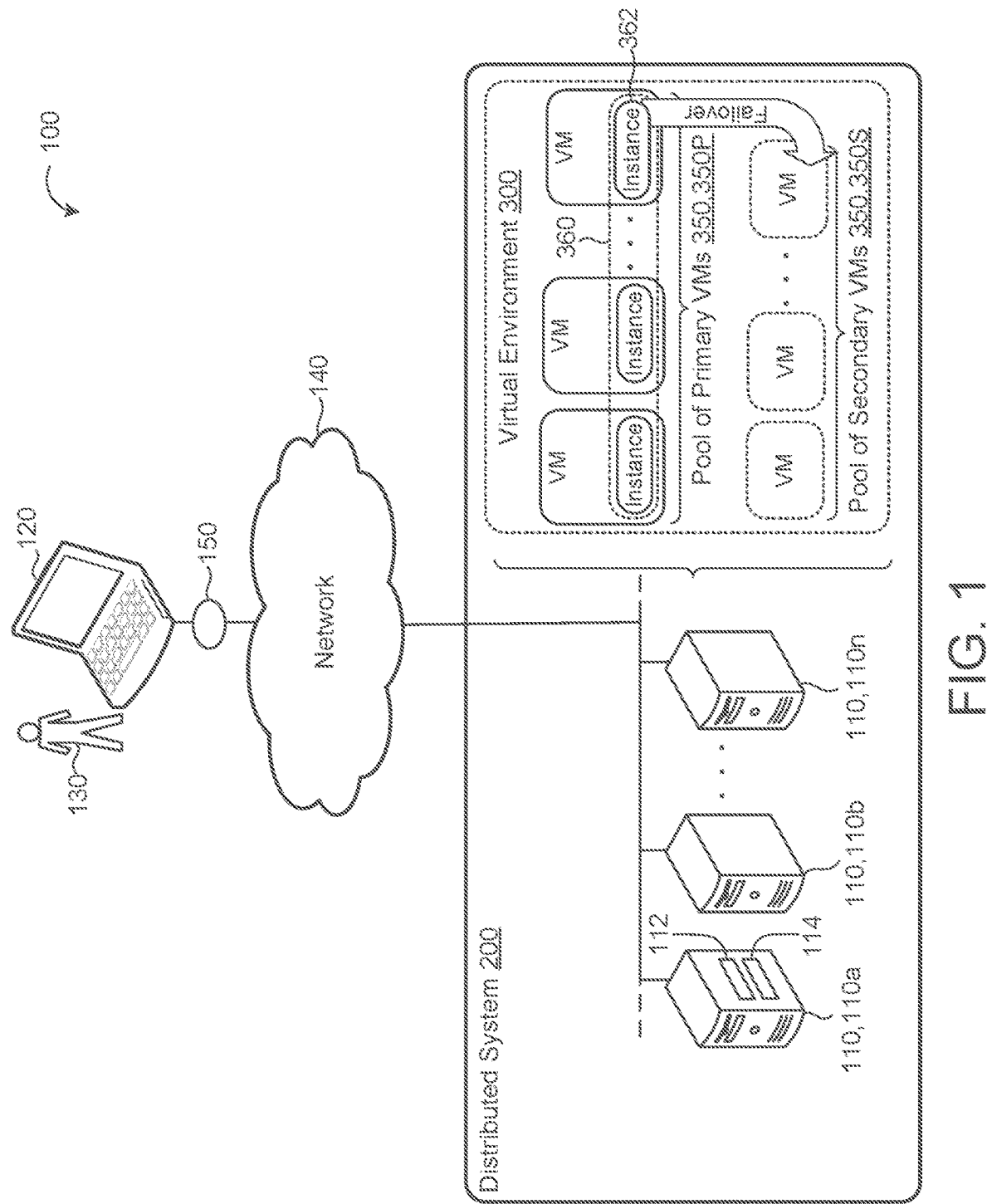
FIG. 1 is a schematic view of an example system include a user device in communication with a distributed system over a network.

A user of a distributed system, such a customer developing a project on the distributed system, may execute one or more virtual machine (VM) instances to execute a software application or service by creating a virtual computing environment that typically emulates a physical computing environment, which may involve specialized hardware, software, or a combination thereof. A VM instance is itself an application that runs on a host machine (e.g., computer server) that executes a host operating system (OS) for managing VM instances running on the host machine. A host machine can run any number of VMs concurrently, such as a portion of a VM (e.g., a VM distributed over multiple host machines), one VM, and multiple VMs. Each VM can be executed on a host machine in a separate environment that is isolated from other VMs running on the host machine. Such separate environments can be referred to as sandboxes or containers. Further, a single VM can run multiple containers with each container running in a separate environment that is isolated from the other containers running on the VM.

The distributed system may provide multi-single-tenant (MST) services that execute software/service instances on VMs. In single tenancy, each instance executes on a separate VM instance. An example MST service may include a Structured Query Language (SQL) relational database. Accordingly, the distributed system may execute a pool of VM instances for a MST service with each VM instance in the pool running/executing a corresponding individual service instance of the service (e.g., software application) using virtualized hardware provided by the VM instance. Optionally, the distributed system may execute a pool of bare metal machines (e.g., bare metal servers) for the MST service with each bare metal machine executing in the pool running/executing a corresponding individual service instance of the service.

Implementations herein are directed toward an adaptive and dynamic approach for maintaining availability of service instances in a computing environment (e.g., distributed system) when primary virtual machine instances executing corresponding individual service instances become unavailable. Based on knowledge that unplanned virtual machine failures are relatively rare (e.g., about every two years) with little or no correlation between them, implementations herein dynamically adjust a number of secondary VMs to maintain availability based on a rate of unavailability (or planned maintenance time period) for each primary VM instance and the number of primary VM instances. The rate of unavailability may indicate a statistical frequency of failure and length of time to re-create a corresponding primary VM instance. As a result, a total number of secondary VM instances instantiated to maintain availability of the service instances is significantly reduced from the conventional technique of allocating one secondary VM instance for each primary VM instance. By reducing the total number of secondary VM instances, additional computing resource requirements in the computing environment (e.g., distributed system) are freed that would otherwise be reserved for maintaining a separate secondary VM instance for every primary VM instance. In addition to consuming less computing resources, the reduction in the total number of secondary VM instances also reduces costs due to reducing the number of physical resources required to create the secondary VM instances.

The technical problem to be solved includes how to better use and allocate resources in a multi-single-tenant (MST) service environment while still ensuring failover capability. The technical solution includes dynamically determining secondary virtual machine capacity requirements and, in particular, pooling secondary VM instances to ensure failover capability. Here, the pooling of secondary VM instances allows for a reduction in resources (e.g., processing time, memory, etc.) reserved for secondary VM instances, thereby releasing additional resources for other uses by the computing environment. In the optional implementations where each primary bare metal machine in a pool of primary bare metal machines executes/runs a corresponding service instance, implementations herein may similarly ensure failover capability by dynamically instantiating a pool of secondary bare metal machines based on a number of secondary bare metal machines required to maintain availability of the service instances when one or more primary bare metal machines fail.

Implementations further reduce resources for secondary VM instances by optionally running secondary VM instances with lower levels of resources until called upon in a failover from a corresponding primary VM instance, and then increasing/growing the resources to match the resource requirements (target levels) of the failed/unavailable primary VM instance. Here, the target levels of the unavailable VM instance correspond to target resource levels specified by the corresponding service instance that failed over to the secondary VM instance for execution thereon. Further implementations allow use of a reduced number of high resource secondary VM instances since low resource primary VM instances can failover to high resource secondary VM instances without negative impacts. Here, the secondary VM instances can be reduced to the appropriate size after failover.

FIG. 1 depicts an example system 100 that includes a distributed system 200 configured to run a software application 360 (e.g., service) in a virtual computing environment 300 executing on a pool of primary VM instances 350, 350P. A user device 120 (e.g., a computer) associated with a user 130 (customer) communicates, via a network 140, with the distributed system 200 to provide commands 150 for deploying, removing, or modifying primary VM instances 350P running in the virtual computing environment 300. Accordingly, the number of primary VM instances 350P in the pool of primary VM instances 350P may dynamically change based on commands 150 received from the user device 120.

In some examples, the software application 360 is associated with a MST service and each primary VM instance 350P is configured to execute a corresponding individual service instance 362 (e.g., a single tenant of the MST service) of the software application 360. In the event that one or more primary VM instances 350P become unavailable, the distributed system 200 executes a computing device 112 configured to instantiate a pool of secondary VM instances 350, 350S in order to maintain availability of the one or more individual service instances 362 associated with the unavailable primary VM instances 350P. For instance, responsive to a primary VM instance 350P executing a corresponding individual service instance 362 becoming unavailable, the computing device 112 (e.g., data processing hardware) may cause the individual service instance 362 to failover to one of the secondary VM instances 350S in the pool of secondary VM instances 350S so that the individual service instance 362 does not go unavailable for an indefinite period of time. Thus, rather than experiencing downtime to re-create an unavailable primary VM 350P, the distributed system 200 may failover to one of the instantiated secondary VM instances 350 on the fly so that the user's 130 existing individual service instance 362 is not interrupted. A primary VM instance 350P may become unavailable as a result of an unplanned and unexpected failure, a delay in re-creating the primary VM instance 350P, and/or as a result of a planned maintenance time period for the primary VM instance 350P, such as updates for critical security patches to a kernel of the primary VM instance 350P.

While techniques that create a separate secondary VM instance 350S as a back-up for each primary VM instance 350P advantageously afford high availability, the downside of these techniques is that the majority of these passive secondary VM instances 350S remain idle indefinitely since it is generally rare for a primary VM instances 350P to fail, thereby causing an exorbitant amount of resources to go unused. Additionally, undue costs incur based on the resource requirements needed to create one secondary VM instance 350S for each primary VM instance 350P. In order to still maintain availability of individual service instances 362 when one or more primary VM instances 350P are unavailable, but without incurring the inefficiencies and high costs associated with the aforementioned high availability techniques, implementations herein are directed toward instantiating the pool of secondary VM instances 350S with a reduced number of secondary VM instances 350S in relation to the number of primary VM instances 350P in the pool of primary VM instances 350P. Here, the computing device 112 may determine a number of secondary VM instances required to maintain availability when one or more of the primary VM instances are unavailable based on the number of primary VM instances 350P in the pool of primary VM instances 350P and a rate of unavailability for each primary VM instance 350P.

The rate of unavailability of a primary VM instance 350P may include at least one of a frequency of unavailability or a period of unavailability. For instance, each primary VM instance 350P may include a corresponding mean-time-to-failure (MTTF) indicating how long (e.g., a number of days) the primary VM instance 350P is expected to be operational before incurring a failure. The MTTF value could be 365 days (e.g., 1 year) or 720 days (e.g., 2 years). The rate of unavailability for each primary VM instance 350P may further include an expected length of time to re-create (e.g., stock-out value) the corresponding primary VM instance. For example, a VM instance 350 may be associated with a stock-out value while the distributed system 200 waits for resources (i.e., processing resources and/or memory resources) to become available for re-creating the VM instance 350. The MTTF and the expected length of time to re-create each primary VM instance 350P can be obtained through statistical analysis and/or machine learning techniques by observing execution of VM instances 350 having a same or similar VM type (i.e., processing resources, memory resources, storage resources, network configuration).

As the number of primary VM instances 350P executing in the virtual environment 300 continuously changes due to the user 130 adding/removing primary VM instances 350P and/or primary VM instances 350 becoming unavailable, the distributed system 200 (i.e., via the computing device 112) is configured to dynamically update the number of secondary VM instances 350S instantiated in the pool of secondary VM instances 350S. In some examples, the pool of primary VM instances 350P is associated with a single user/customer 130 and the pool of secondary VM instances 350S are only instantiated for use by the single user/customer 130. In other examples, the pool of primary VM instances 350P includes multiple sub-pools of primary VM instances 350P with each sub-pool associated with a different user/customer 130 and isolated from the other sub-pools. In these examples, the pool of secondary VM instances 350S is shared among the multiple different user/customers 130 in events that one or more primary VM instances 350P in any of the sub-pools are unavailable.

In some implementations, the virtual computing environment 300 is overlaid on resources 110, 110a-n of the distributed system 200. The resources 110 may include hardware resources 110 and software resources 110. The hardware resources 110 may include computing devices 112 (also referred to as data processing devices and data processing hardware) or non-transitory memory 114 (also referred to as memory hardware). The software resources 110 may include software applications, software services, application programming interfaces (APIs) or the like. The software resources 110 may reside in the hardware resources 110. For example, the software resources 110 may be stored in the memory hardware 114 or the hardware resources 110 (e.g., the computing devices 112) may be executing the software resources 110.

The network 140 may include various types of networks, such as local area network (LAN), wide area network (WAN), and/or the Internet. Although the network 140 may represent a long range network (e.g., Internet or WAN), in some implementations, the network 140 includes a shorter range network, such as a local area network (LAN). In some implementations, the network 140 uses standard communications technologies and/or protocols. Thus, the network 140 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, Bluetooth, Bluetooth Low Energy (BLE), etc. Similarly, the networking protocols used on the network 132 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 140 uses custom and/or dedicated data communications technologies instead of, or in addition to, the ones described above.

Figure 2:
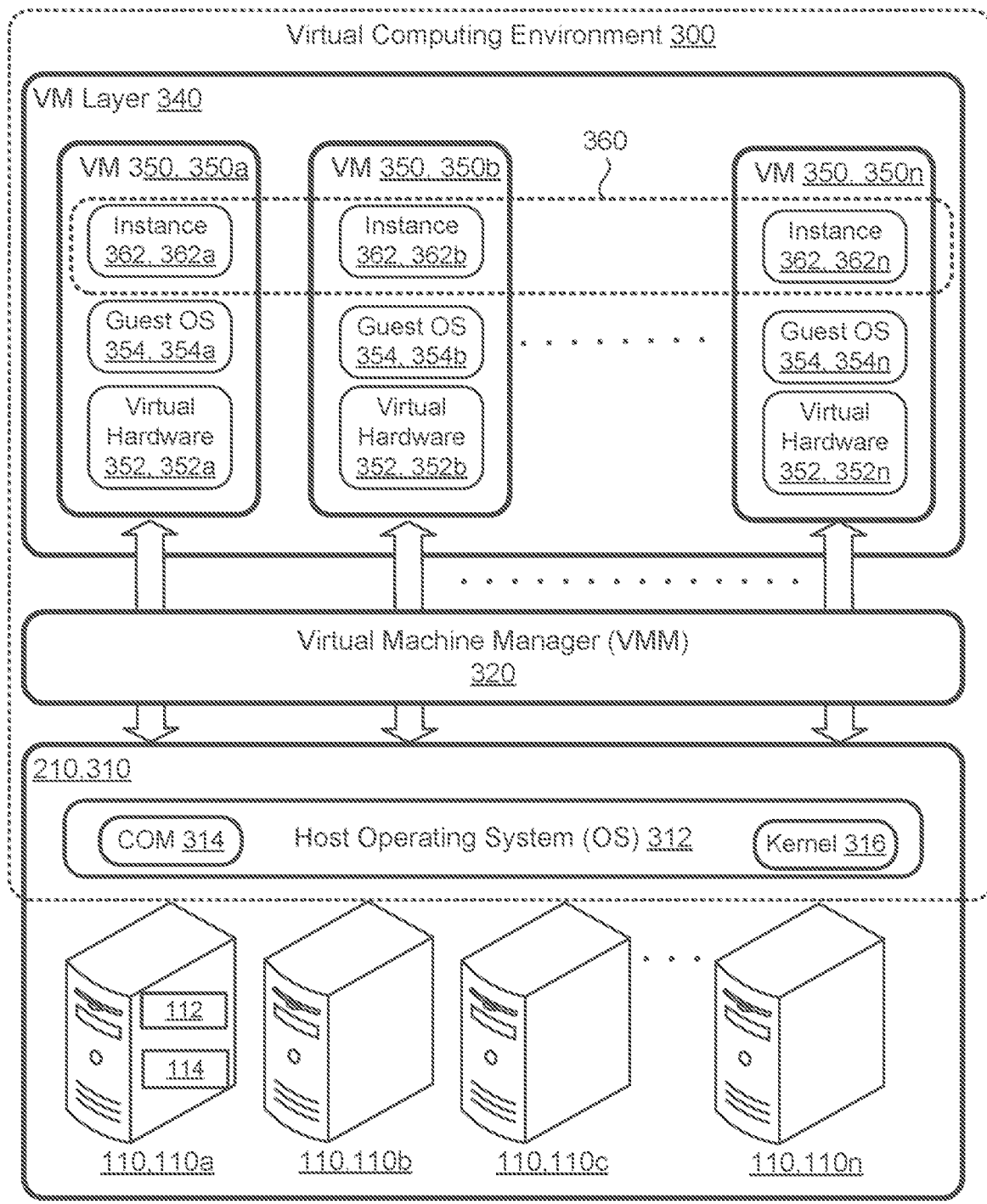
FIG. 2 is a schematic view of an example distributed system executing a virtual computing environment.

In the example shown in FIG. 2, the distributed system 200 includes a collection 210 of resources 110 (e.g., hardware resources 110) executing the virtual computing environment 300. The virtual computing environment 300 includes a virtual machine manager (VMM) 320 and a virtual machine (VM) layer 340 running one or more virtual machines (VMs) 350, 350a-n configured to execute instances 362a, 362a-n of one or more software applications 360. Each hardware resource 110 may include one or more physical central processing units (pCPU) 112 ("data processing hardware 112") and memory hardware 114. While each hardware resource 110 is shown having a single physical processor 112, any hardware resource 110 may include multiple physical processors 112. A host operating system (OS) 312 may execute on the collection 220 of resources 110.

In some examples, the VMM 320 corresponds to a hypervisor 320 (e.g., a Compute Engine) that includes at least one of software, firmware, or hardware configured to create, instantiate/deploy, and execute the VMs 350. A computer (i.e., data processing hardware 112) associated with the VMM 320 that executes the one or more VMs 350 may be referred to as a host machine 310, while each VM 350 may be referred to as a guest machine. Here, the VMM 320 or hypervisor is configured to provide each VM 350 a corresponding guest operating system (OS) 354, 354a-n having a virtual operating platform and manage execution of the corresponding guest OS 354 on the VM 350. As used herein, each VM 350 may be referred to as an "instance" or a "VM instance". In some examples, multiple instances of a variety of operating systems may share virtualized resources. For instance, a first VM 350 of the Linux® operating system, a second VM 350 of the Windows® operating system, and a third VM 350 of the OS X® operating system may all run on a single physical x86 machine.

The VM layer 340 includes one or more virtual machines 350. The distributed system 200 enables the user 130 to launch VMs 350 on demand, i.e., by sending a command 150 (FIG. 1) to the distributed system 200 via the network 140. For instance, the command 150 may include an image or snapshot associated with the corresponding operating system 312 and the distributed system 200 may use the image or snapshot to create a root resource 110 for the corresponding VM 350. Here, the image or snapshot within the command 150 may include a boot loader, the corresponding operating system 312, and a root file system. In response to receiving the command 150, the distributed system 200 may instantiate the corresponding VM 350 and automatically start the VM 350 upon instantiation. A VM 350 emulates a real computer system (e.g., host machine 310) and operates based on the computer architecture and functions of the real computer system or a hypothetical computer system, which may involve specialized hardware, software, or a combination thereof. In some examples, the distributed system 200 authorizes and authenticates the user 130 before launching the one or more VMs 350. An instance 362 of a software application 360, or simply an instance, refers to a VM 350 hosted on (executing on) the data processing hardware 112 of the distributed system 200.

Figure 3:
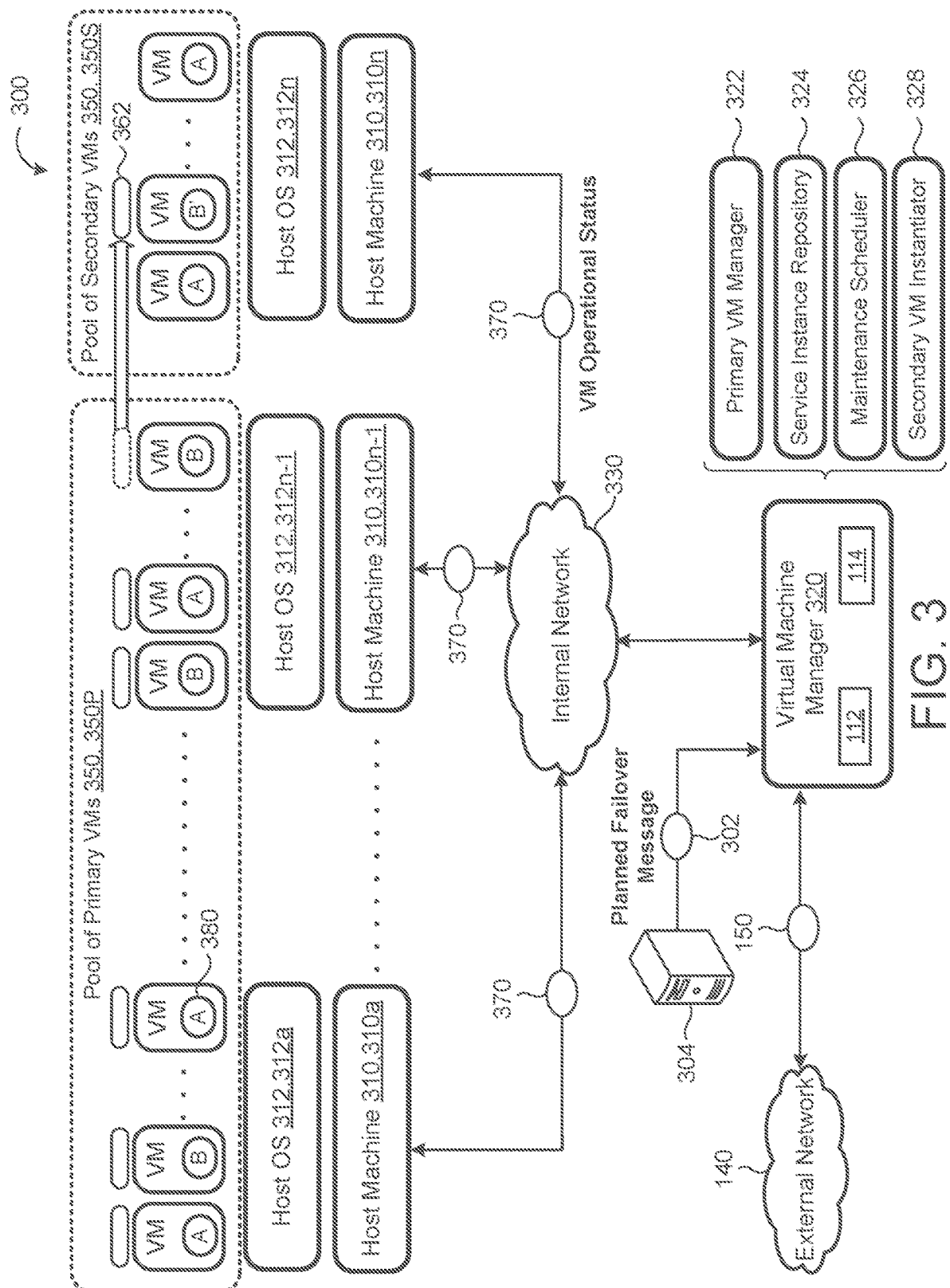
FIG. 3 is a schematic view of an example virtual computing environment having a pool of primary virtual machines and a pool of secondary virtual machines.

The host OS 312 virtualizes underlying host machine hardware and manages concurrent execution of one or more VM instances 350. For instance, host OS 312 may manage VM instances 350a-n and each VM instance 350 may include a simulated version of the underlying host machine hardware, or a different computer architecture. The simulated version of the hardware associated with each VM instance 350, 350a-n is referred to as virtual hardware 352, 352a-n. The virtual hardware 352 may include one or more virtual central processing units (vCPUs) ("virtual processor") emulating one or more physical processors 112 of a host machine 310 (FIG. 3). The virtual processor may be interchangeably referred to a "computing resource" associated with the VM instance 350. The computing resource may include a target computing resource level required for executing the corresponding individual service instance 362.

The virtual hardware 352 may further include virtual memory in communication with the virtual processor and storing guest instructions (e.g., guest software) executable by the virtual processor for performing operations. For instance, the virtual processor may execute instructions from the virtual memory that cause the virtual processor to execute a corresponding individual service instance 362 of the software application 360. Here, the individual service instance 362 may be referred to as a guest instance that cannot determine if it is being executed by the virtual hardware 352 or the physical data processing hardware 112. If a guest service instance 362 executing on a corresponding VM instance 350, or the VM instance 350 itself, malfunctions or aborts, other VM instances executing corresponding individual service instances 362 will not be affected. A host machine's microprocessor(s) can include processor-level mechanisms to enable virtual hardware 352 to execute software instances 362 of applications 360 efficiently by allowing guest software instructions to be executed directly on the host machine's microprocessor without requiring code-rewriting, recompilation, or instruction emulation. The virtual memory may be interchangeably referred to as a "memory resource" associated with the VM instance 350. The memory resource may include a target memory resource level required for executing the corresponding individual service instance 362.

The virtual hardware 352 may further include at least one virtual storage device that provides storage capacity for the service on the physical memory hardware 114. The at least one virtual storage device may be referred to as a storage resource associated with the VM instance 350. The storage resource may include a target storage resource level required for executing the corresponding individual service instance 362. The guest software executing on each VM instance 350 may further assign network boundaries (e.g., allocate network addresses) through which respective guest software can communicate with other processes reachable through an internal network 330 (FIG. 3), the external network 140 (FIG. 1), or both. The network boundaries may be referred to as a network resource associated with the VM instance 350.

The guest OS 354 executing on each VM 350 includes software that controls the execution of the corresponding individual service instance 362, 362a-n of the application 360 by the VM instance 350. The guest OS 354, 354a-n executing on a VM instance 350, 350a-n can be the same or different as the other guest OS 354 executing on the other VM instances 350. In some implementations, a VM instance 350 does not require a guest OS 354 in order to execute the individual service instance 362. The host OS 312 may further include virtual memory reserved for a kernel 316 of the host OS 312. The kernel 316 may include kernel extensions and device drivers, and may perform certain privileged operations that are off limits to processes running in a user process space of the host OS 312. Examples of privileged operations include access to different address spaces, access to special functional processor units in the host machine 310 such as memory management units, and so on. A communication process 314 running on the host OS 312 may provide a portion of VM network communication functionality and may execute in the user process space or a kernel process space associated with the kernel 316.

Referring to FIG. 3, in some implementations, a virtual computing environment 300 running on the distributed system 200 includes multiple host machines 310, 310a-n (e.g., one or more data processing apparatus such as rack mounted servers or different computing devices) that may be located in different physical locations and can have different capabilities and computer architectures. The host machines 310 may communicate with each other through an internal data communications network 330 (internal network). The internal network 330 can include one or more wired (e.g., Ethernet) or wireless (e.g., Wi-Fi) networks, for example. In some implementations, the internal network 330 is an intranet. Optionally, the host machines 310 may also communicate with devices on the external network 140, such as the Internet. Other types of external networks are possible.

In the example shown, each host machine 310 executes a corresponding host operating system (OS) 312, 312a-n that virtualizes the underlying hardware (i.e., data processing hardware 112 and memory hardware 114) of the host machine 310 and manages concurrent execution of multiple VM instances 350. For instance, host operating systems 312a-312n-1 each manage concurrent execution of multiple primary VM instances 350P to collectively provide the pool of primary VMs 350P, while host operating system 312n executing on host machine 310n manages execution of the pool of secondary VM instances 350S. Here, a dedicated host machine (e.g., host machine 310n) hosts the entire pool of secondary VM instances 350S, thereby ensuring that sufficient resources are available for use by the secondary VM instances 350S in the event of a failover (without requiring the failover secondary VM instances 350S to migrate to a different host machine 310 with sufficient resources). In other examples, however, one or more of the secondary VM instances 350S may be instantiated across multiple host machines 310 that may also be executing one or more primary VM instances 350P.

In some implementations, the virtual machine manager 320 uses a primary VM manager 322 to create and deploy each primary VM instance 350P in the pool of primary VM instances 350 for execution on a designated host machine 310. The VMM 320 may create each primary VM instance 350 by allocating computing resource levels, memory resource levels, network specifications, and/or storage resource levels required for executing the corresponding individual service instance 362. Thus, each primary VM instance 350P in the pool of primary VM instances 350P may include a corresponding VM type 380 that indicates at least one of memory resource requirements, computing resource requirements, network specification requirements, or storage resource requirements for the corresponding primary VM instance 350. In the example shown, all the primary VM instances 350P in the pool of primary VM instances 350P have VM type 380 of Type A or of Type B. Thus, a VM type 380 of Type A may include at least one of computing resource levels, memory resource levels, a network specification, or storage resource levels that are different than a VM type 380 of Type B.

The primary VM manager 322 at the VMM 320 may maintain an active log of each VM instance 350P deployed into the pool of primary VM instances 350P, the VM type 380 of each VM instance 350P, and the corresponding individual service instance 362 executing on each primary VM instance 350P. The log may be updated as primary VM instances 350P are deployed into, or removed from, the pool of primary VM instances 350P. Additionally, the pool of primary VM instances 350P may be further divided into sub-pools based on a distribution of the primary VM instances 350P in various fault domains, such as building, zone, or region. In some implementations, the individual service instances 362 each execute in a corresponding container that runs on a single primary VM instance 350P with multiple other containers. Accordingly, the log may indicate a list of containers running on each primary VM instance 350P, as well as the corresponding service instance 362 executing in each container.

The primary VM manager 322 further obtains the rate of unavailability for each primary VM instance 350P. In some examples, all of the primary VM instances 350P in the pool of primary VM instances 350P include the same rate of unavailability. In other examples, the primary VM instances 350P associated with the type A VM type 380 include a rate of unavailability that is different than a rate of availability for the primary VM instances 350P associated with the type B VM type 380. As set forth in the remarks above, each primary VM instance 350P may include the corresponding MTTF value, indicating how long (e.g., a number of days) the primary VM instance 350P is expected to be operational before incurring a failure, and the stock-out value, indicating an expected length of time to re-create the primary VM instance 350P. The MTTF value and the stock-out value may be derived from observed monitoring data as well as machine learning algorithms that observe execution of similar VM instances 350 over time.

For instance, each primary VM instance 350P may include a corresponding mean-time-to-failure (MTTF) indicating how long (e.g., a number of days) the primary VM instance 350P is expected to be operational before incurring a failure. The MTTF value could be 365 days (e.g., 1 year) or 720 days (e.g., 2 years). The rate of unavailability for each primary VM instance 350P may further include an expected length of time to re-create (e.g., stock-out value) the corresponding primary VM instance. For example, a VM instance 350 may be associated with a stock-out value while the distributed system 200 waits for resources (i.e., processing resources and/or memory resources) become available for re-creating the VM instance 350. The MTTF and the expected length of time to re-create each primary VM instance 350P can be obtained through statistical analysis and/or machine learning techniques by observing execution of VM instances 350 having a same or similar VM type (i.e., processing resources, memory resources, storage resources, network configuration).

The VMM 320 may further maintain a service instance repository 324 indicating each individual service instance 362 of the software application 360 executing on a corresponding primary VM instance 350P of the pool of primary VM instances 350P and the target resource levels required for executing the corresponding individual service instance 362. In some examples, each individual service instance 362 in the repository 324 may specify whether or not the corresponding service instance 362 permits reduced performance requirements for a temporary time after a failover. In these examples, a service instance 362 permitting reduced performance requirements allows the service instance 362 to failover to a secondary VM instance 362 with a corresponding resource level (e.g., a processor resource level, memory resource level, or storage resource level) that is less than a corresponding target resource level associated with the corresponding individual service instance 362, and then dynamically grow/increase the corresponding resource level of the secondary VM instance until the target resource level is satisfied. Thus, the secondary VM instance 350S may initially execute the individual service instance 362 with reduced performance until the corresponding resource level grows to satisfy the corresponding target resource level associated with the individual service instance 362. In these examples, the secondary VM instances 350S may be allocated less resources while sitting idle and may resize/grow as needed once called upon to execute an individual service instance 362 during a failover.

In some examples, the VMM 320 includes a maintenance scheduler 326 that identifies maintenance time periods when one or more primary VM instances 350P in the pool of primary VM instances 350P will be unavailable for maintenance/updates performed off-line. For instance, the maintenance scheduler 326 may indicate a number of primary VM instances 350P that will be unavailable during a planned maintenance time period to perform maintenance/updates. In one example, the distributed system 200 periodically rolls out a kernel update at a two-percent (2%) deployment rate (or other percentage/value) such that two-percent of primary VM instances 350P in the pool of primary VM instances 350P will be unavailable during the planned maintenance time period to complete the update. A kernel update may include fixing security patches in a kernel 216 associated with the VM instance 350. In some examples, the VMM 320 receives a planned failover message 302 from a computing device 304 that indicates the number (or percentage) of primary VM instances 350P that will be unavailable during a planned maintenance time period to perform maintenance/updates. The computing device 304 may belong to an administrator of the distributed system 200. Optionally, the user device 120 may provide the planned failover message 302 via the external network 140 when the user 130 wants to update one or more primary VM instances 350P in the pool of primary VM instances 350P.

In some implementations, the VMM 320 includes a secondary VM instantiator 328 in communication with the primary VM manager 322, the service instance repository 324, and the maintenance scheduler 326 for instantiating the pool of secondary VM instances 350S. In these implementations, the secondary VM instantiator 328 determines a number of secondary VM instances 350S required to maintain availability of the individual service instances 362 when one or more of the primary VM instances 350P are unavailable based on the number of primary VM instances 350P in the pool of primary VM instances 350P and the rate of unavailability of each primary VM instance 350P. In some examples, the secondary VM instantiator 328 determines the number of secondary VM instances by calculating:

$$VM_{secondary\_N} = \frac{VM_{Primary\_Pool} \times SO}{MTTF} \quad [1]$$

where $VM_{secondary\_N}$ is the number of secondary VM instances 350S required to maintain availability of the individual service instances 362, $VM_{Primary\_Pool}$ is the number of primary VM instances 350P in the pool of primary VM instances 350P. SO is a highest stock-out value among the primary VM instances 350P indicating a number of days to re-create the corresponding primary VM instance 350P, and MTTF is a lowest mean-time-to-failure value in days among the primary VM instances 350P.

In one example, when the number of primary VM instances 350P is equal to one-thousand (1,000), and each VM instance 350P has an MTTF value equal to one year (365 days) and a stock-out value equal to five (5) days, the number of secondary VM instances 350S ($VM_{secondary\_N}$) calculated using Eq. 1 is equal to fourteen (14). Unless the maintenance scheduler 326 identifies more than 14 primary VM instances that will be unavailable during a planned maintenance time period, then the secondary VM instantiator 328 will instantiate a number of secondary VM instances 350S equal to the number (e.g., 14) of secondary VM instances 350S required to maintain availability of the individual service instances 362. Otherwise, when the maintenance scheduler 326 identifies a greater number (e.g., greater than 14) of primary VM instances 350P unavailable during a planned maintenance time period, then the secondary VM instantiator 328 will instantiate a number of secondary VM instances 350S equal to the number of primary VM instances 350P that will be unavailable during a planned maintenance time period. For instance, in the example above, when the kernel update rolls out at the two-percent (2%) deployment rate (or other deployment), the secondary VM instantiator 328 will need to ensure that twenty (20) (e.g., 2% of 1,000 primary VM instances) are instantiated into the pool of secondary VM instances 350S to provide failover coverage for the planned fail over event.

In scenarios when the kernel update (or other maintenance/update procedures rendering primary VM instances 350P unavailable during a planned time period) occurs after initially instantiating the pool of secondary VM instances 350 to maintain availability for unplanned failovers (e.g., instantiating 14 secondary VM instances 350S in the example above), the secondary VM instantiator 328 may simply instantiate additional secondary VM instances 350S to provide failover coverage during the planned maintenance time period. In some examples, the pool of secondary VM instances 350S updates by removing (i.e., deallocating resources) one or more secondary VM instances 350S once a planned maintenance time period terminates.

Instantiating a lower number of secondary VM instances 350S than the number of primary VM instances 350P in the pool of primary VM instances 350P alleviates the need to provision (and have sit idle) one secondary VM instance 350S for each primary VM instance 350P. Each secondary VM instance 350S in the pool of secondary VM instances 350S sits idle and does not execute any workload (e.g., service instance) unless one of the primary VM instances 350P having a corresponding VM type 380 becomes unavailable (e.g., fails), thereby causing the unavailable primary VM instance 350P to failover to the idle/passive secondary VM instance 350S to commence executing the individual service instance 362 associated therewith. As secondary VM instances 350S are utilized during failovers, the secondary VM instantiator 328 dynamically adjusts the pool of secondary VM instances 350S as needed in order to ensure enough secondary VM instances 350S are always present to maintain availability of the individual service instances 362 of the software application 360. During the failover, the secondary VM instance 350S may be reconfigured with the appropriate resources (e.g., network configuration settings and/or storage resources) and executing a startup application associated with the unavailable primary VM instance 350P.

In some implementations, the pool of secondary VM instances 350S is per customer/user 130, rather than global, when the customer/user 130 deploys a large number of primary VM instances 350P and has specific networking or isolation requirements that prevents sharing of the pool of secondary VM instances 350S with other users/customers of the distributed system 200. In other implementations, the pool of secondary VM instances 350S is shared among all individual service instances 362 across all customers/users of the distributed system 200.

In some examples, the primary VM manager 322 determines the corresponding VM type 380 for each primary VM instance 350P in the pool of primary VM instances 350P and the secondary VM instantiator 328 instantiates at least one secondary VM instance 350S having the same (or corresponding) VM type 380 for each different VM type 380 in the pool of primary VM instances 350P. Thus, the secondary VM instantiator 328 may ensure that enough secondary VM instances 350S are available for each VM type 380 in the pool of primary VM instances 350P. In some configurations (not shown), the pool of secondary VM instances 350S is divided into a plurality of sub-pools based on VM type 380. For instance, each sub-pool of secondary VM instances 350S will include one or more secondary VM instances 350S having a respective VM type 380.

In some examples, the secondary VM instantiator 328 instantiates one or more secondary VM instances 350S in the pool of secondary VM instances 350S with a corresponding resource level that is less than the corresponding target resource level associated with the individual service instance 362 (i.e., when the service instance repository 324 indicates the individual service instance 362 permits reduced performance requirements). For instance, FIG. 3 shows a secondary VM instance 350S having a corresponding VM type 380 of Type B' that is related, but not identical, to the VM type 380 of Type B in the pool of primary VM instances 350P. Here, the secondary VM instance 350S with the VM type 380 of Type B' includes at least one corresponding resource level (such as computing resource level and/or memory resource level) that is less than the corresponding resource level associated with the VM type 380 of Type B. During a failover to the secondary VM instance 350S (of Type B'), however, the at least one corresponding resource level (e.g., computing resource level and/or memory resource level) may dynamically grow/increase until the at least one corresponding target resource level (e.g., as defined by Type B) is satisfied. In these examples, the required resources of the pool of secondary VM instances 350S is reduced while the secondary VM instances 350S are passive and sitting idle, thereby reducing costs that would otherwise incur for maintaining resource levels that are not used unless a failover occurs.

In some implementations, the secondary VM instantiator 328 instantiates one or more secondary VM instances 350S in the pool of secondary VM instances 350S with corresponding resource levels greater than the corresponding resource levels of the primary VM instances 350P in the pool of primary VM instances 350P. For instance, the secondary VM instance 350S having the corresponding VM type 380 of Type B' may instead indicate that the secondary VM instance 350S is associated with greater corresponding resource levels than the corresponding resource levels associated with the VM type 380 of Type B while the secondary VM instance 350S sits idle. During a failover to the secondary VM instance 350S (of type B'), however, the corresponding resource levels (e.g., computing resource level, memory resource level, and/or storage resource level) may dynamically reduce/decrease until the corresponding target resource levels (e.g., as defined by Type B) are satisfied. By providing larger secondary VM instances 350S (greater resource levels) than the primary VM instances 350P in the pool of primary VM instances 350P, the size (number of secondary VM instances 350S) of the pool of secondary VM instances 350S can be reduced.

In implementations when the primary workload (e.g., service instances 362) executes in primary containers, the secondary VM instantiator 328 may instantiate multiple secondary containers in a single secondary VM instance. Thus, a primary container running on a primary VM instance 350P that becomes unavailable (e.g., fails) may failover to the secondary container in the pool of secondary VM instances 350S. In this scenario, the secondary VM instance 350S running the secondary container may deallocate remaining resources not used by the secondary container for use by other VM instances 350, 350P, 350S in the virtual environment 300.

In some scenarios, the VMM 320 (or a host machine 310) identifies unavailability of one of the primary VM instances 350P in the pool of primary VM instances 350P. For example, each primary VM instance 350P may employ an agent to collect an operational status 370 indicating whether or not the primary VM instance 350P is operating or is unavailable due to a failure. The host machines 310 may communicate the operational status 370 of VM instances 350 to the VMM 320, in addition to one another. As used herein, the term "agent" is a broad term, encompassing its plain and ordinary meaning, including, but not limited to, a portion of code that is deployed inside a VM instance 350 (as part of the guest OS 354 and/or as an application running on the guest OS 354) to identify the operational status 370 of the VM instance 350. Accordingly, the VMM 320 and/or the host machine 310 may receive the operational status 370 indicating unavailability of one of the primary VM instances 350, and cause the unavailable primary VM instance 350P to fail over to one of the secondary VM instances 350S to commence executing the individual service instance 362 associated with the unavailable primary VM instance 350P. In the example shown in FIG. 3, the operational status 370 indicates unavailability (e.g., due to failure) of one of the primary VM instances 350P executing on host machine 310n-1 and having VM type 380 of Type B, thereby causing the primary VM instance 350P to fail over to a secondary VM instance 350S having the VM type 380 of Type B' to commence executing the individual service instance 362 associated with the unavailable primary VM instance 350P having the VM type 380 of Type B.

In some examples, the VM type 380 of Type B' indicates that the corresponding secondary VM instance 350S includes at least one corresponding resource level (e.g., computing resource level and/or memory resource level) that is less than a target resource level associated with the corresponding individual service instance 362 (as defined by VM type 380 of Type B). During execution of the individual service instance 362 by the corresponding secondary VM instance 350S after the failover, the secondary VM instance 350S is configured to grow the at least one corresponding resource level until the target resource level associated with the individual service instance 362 is satisfied. In other examples, the VM type 380 of Type B' indicates that the corresponding secondary VM instance 350S is larger (e.g., includes greater resource levels) than the unavailable primary VM instance 350P having the VM type 380 of Type B. In these examples, the secondary VM instance 350S may reduce/decrease its resource levels to satisfy the target resource levels associated with the individual service instance 362.

Figure 4:
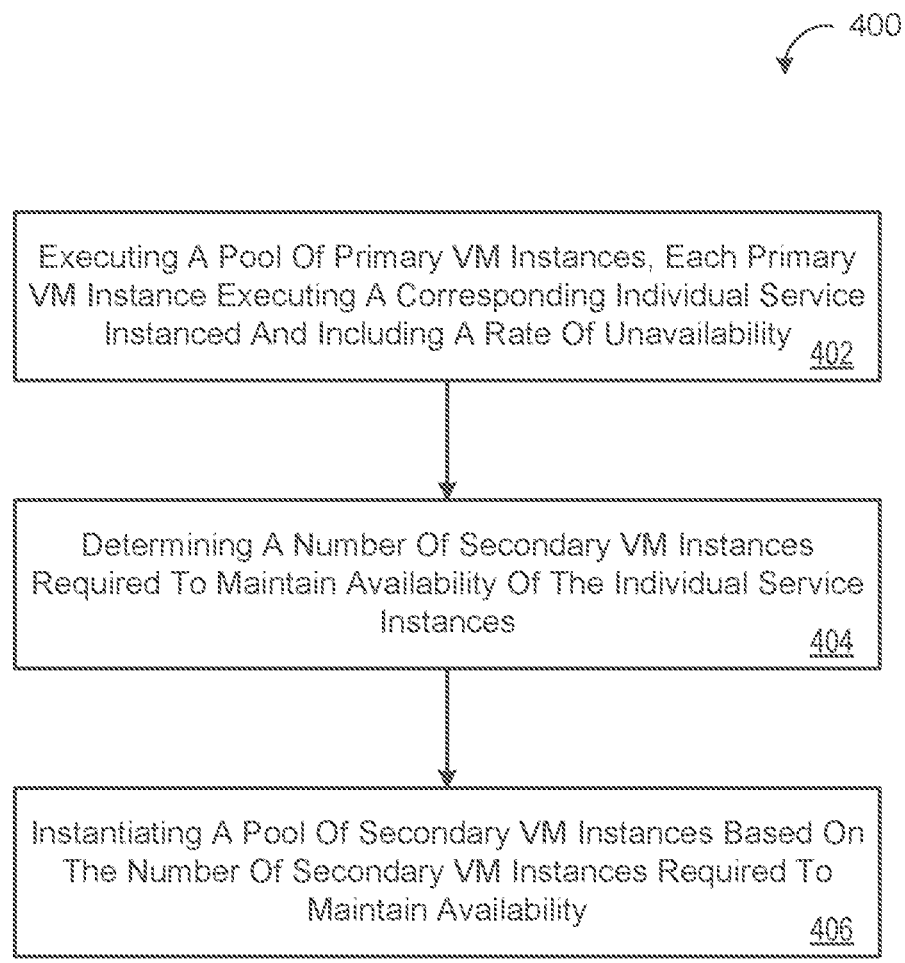
FIG. 4 is a flowchart of an example arrangement of operations for a method of maintaining availability of virtual machine instances.

FIG. 4 provides an example arrangement of operations for a method 400 of maintaining availability of service instances 362 on a distributed system 200. The service instance 362 may correspond to individual service instances 362 in a multi-single-tenant service 360. At block 402, the method 400 includes executing, by data processing hardware 112 of the distributed system 200, a pool of primary virtual machine (VM) instances 350P. Each primary VM instance 350P executes a corresponding individual service instance 362 (associated with a service/software application 360) and includes a rate of unavailability. Optionally, each primary VM instance 350P may execute multiple primary containers and each primary container executes a corresponding individual service instance 362 in a secure execution environment isolated from the other primary containers. The rate of unavailability may include at least one of a frequency of unavailability or a period of unavailability. In some implementations, the method 400 also includes determining, by the data processing hardware 112, the rate of unavailability for each primary VM instance 350P in the pool of primary VM instances 350P based on a mean-time-to-failure (MTTF) and an expected length of time (e.g., stock-out value) to re-create the corresponding primary VM instance. As used herein, the MTTF indicates how often (e.g., a number of days) the primary VM instance 350P is expected to be operational before incurring a failure. The MTTF value and the stock-out value may be derived from observed monitoring data as well as machine learning algorithms that observe execution of similar VM instances 350 over time.

At block 404, the method 400 also includes determining, by the data processing hardware 112, a number of secondary VM instances required to maintain availability of the individual service instances 362 when one or more of the primary VM instances 350P are unavailable based on the number of primary VM instances 350P in the pool of primary VM instances 350P and the rate of unavailability. As used herein, unavailability of a primary VM instance 350P is based on at least one of a failure of the primary VM instance 350P, a delay in re-creating the primary VM instance 350P, or a planned maintenance time period for the primary VM instance 350P. In some examples, the method calculates the number of secondary VM instances required to maintain availability of the individual service instances 362 using Eq. 1.

At block 406, the method 400 also includes instantiating, by the data processing hardware 112, a pool of secondary VM instances 350S based on the number of secondary VM instances 350S required to maintain availability of the individual service instances 362. The number of secondary VM instances instantiated into the pool may further account for a number of primary VM instances 350 that may be unavailable during a planned maintenance time period. For instance, a planned failover message 302 may indicate a deployment rate at which primary VM instances 350P will be unavailable during the planned maintenance time period to perform maintenance/updates. Here, the method 400 may include instantiating a number of secondary VM instances equal to the greater one of: the number of secondary VM instances 350S required to maintain availability of the individual service instances 362; or the number of primary VM instances 350P that will be unavailable during the planned maintenance time period.

Each secondary VM instance 350S in the pool of secondary VM instances may be passive and idle (i.e., not executing a workload) unless a failover causes the corresponding secondary VM instance 350S to commence executing an individual service instance 362 associated with an unavailable primary VM instance 350P. In some examples, method 400 further determines a corresponding VM type 380 for each primary VM instance 350P in the pool of primary VM instances 350P. In these examples, the instantiating the pool of secondary VM instances 350S includes instantiating at least one secondary VM instance 350S having a same VM type 380 for each different VM type 380 in the pool of primary VM instances 350P.

Optionally, when a primary VM instance 350P runs multiple primary containers each executing a corresponding individual service instance, the method may optionally include instantiating a number of secondary containers to maintain availability of the individual service instances when one or more of the primary containers is unavailable (e.g., fails). Here, each secondary VM instance 350S instantiated into the pool of secondary VM instances 350S is configured to run multiple secondary containers.

A software application (i.e., a software resource 110) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory (e.g., memory hardware 114) may be physical devices used to store programs (e.g., sequences of instructions) or data (e.g., program state information) on a temporary or permanent basis for use by a computing device (e.g., data processing hardware 112). The non-transitory memory 114 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
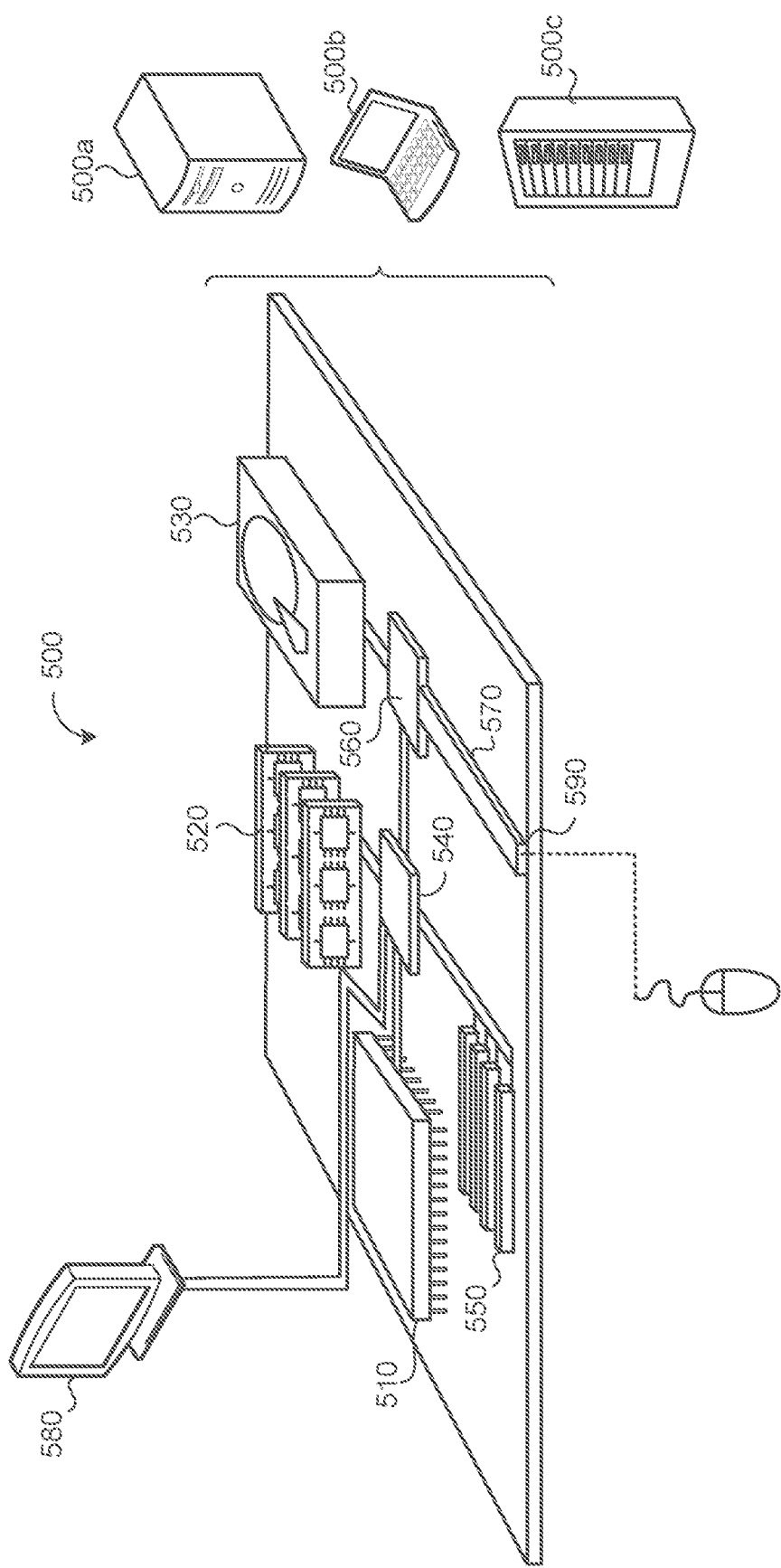
FIG. 5 is an example computing device.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the scope of the disclosure. Accordingly, other implementations are within the scope of the following claims.

What is claimed is:

1. A method of maintaining availability of on a distributed system, the method comprising:
   executing, by data processing hardware of the distributed system, a pool of primary virtual machine (VM) instances, each primary VM instance executing a corresponding individual service instance and comprising a rate of unavailability;
   determining, by the data processing hardware, a number of secondary VM instances required to maintain availability of the individual service instances when one or more of the primary VM instances are unavailable based on the number of primary VM instances in the pool of primary VM instances and the respective rate of unavailability;
   instantiating, by the data processing hardware, a pool of secondary VM instances based on the number of secondary VM instances required to maintain availability of the individual service instances;
   identifying, by the data processing hardware, unavailability of one of the primary VM instances in the pool of primary VM instances;
   causing, by the data processing hardware, the unavailable primary VM instance to failover to one of the secondary VM instances in the pool of secondary VM instances to commence executing the individual service instance associated with the unavailable primary VM instance; and
   after the failover to the secondary VM instances:
      determining, by the data processing hardware, that the secondary VM instances comprises a corresponding resource level that is less than a target resource level associated with the corresponding individual service instance; and
      during execution of the individual service instance by the secondary VM instances, growing, by the data processing hardware, the corresponding resource level of the secondary VM instances until the target resource level associated with the individual service instance is satisfied.

2. The method of claim 1, wherein a number of secondary VM instances in the pool of secondary VM instances is less than the number of primary VM instances in the pool of primary VM instances.

3. The method of claim 1, further comprising updating, by the data processing hardware, the number of secondary VM instances required to maintain availability of the individual service instances when the number of primary VM instances executing in the pool changes.

4. The method of claim 1, wherein unavailability of a primary VM instance is based on at least one of a failure of the primary VM instance, a delay in re-creating the primary VM instance, or a planned maintenance time period for the primary VM instance.

5. The method of claim 1, wherein the rate of unavailability comprises at least one of a frequency of unavailability or a period of unavailability.

6. The method of claim 1, further comprising determining, by the data processing hardware, the rate of unavailability for each primary VM instance in the pool of primary VM instances based on a mean-time-to-failure (MTTF) and an expected length of time to re-create the corresponding primary VM instance.

7. The method of claim 1, wherein each secondary VM instances in the pool of secondary VM instances is passive and idle unless a failover causes the corresponding secondary VM instances to commence executing an individual service instance associated with an unavailable primary VM instance in the pool of primary VM instances.

8. The method of claim 1, wherein instantiating the pool of secondary VM instances comprises:
   determining a corresponding VM type for each primary VM instance in the pool of primary VM instances; and
   for each different VM type in the pool of primary VM instances, instantiating at least one secondary VM instances having the same VM type.

9. The method of claim 8, wherein the corresponding VM type for each primary VM instance indicates at least one of memory resource requirements, computing resource requirements, network specification requirements, or storage resource requirements for the corresponding primary VM instance.

10. The method of claim 1, wherein the pool of secondary VM instances are instantiated for use by a single customer of the distributed system.

11. The method of claim 1, wherein the pool of secondary VM instances are shared among multiple customers of the distributed system.

12. The method of claim 1, further comprising:
   receiving, at the data processing hardware, a planned failover message indicating a number of primary VM instances in the pool of primary VM instances that will be unavailable during a planned maintenance time period,
   wherein instantiating the pool of secondary VM instances is further based on the number of primary VM instances that will be unavailable during the planned maintenance time period.

13. The method of claim 12, wherein instantiating the pool of secondary VM instances comprises instantiating a number of secondary VM instances equal to the greater one of:
   the number of secondary VM instances required to maintain availability of the individual service instances; or
   the number of primary VM instances that will be unavailable during the planned maintenance time period.

14. A system for maintaining availability of service instances on a distributed system, the system comprising:
   data processing hardware;
   memory hardware in communication with the data processing hardware, the memory hardware storing instructions that when executed on the data processing hardware cause the data processing hardware to perform operations comprising:
      executing a pool of primary virtual machine (VM) instances, each primary VM instance executing a corresponding individual service instance and comprising a rate of unavailability;
      determining a number of secondary VM instances required to maintain availability of the individual service instances when one or more of the primary VM instances are unavailable based on the number of primary VM instances in the pool of primary VM instances and the respective rate of unavailability;

instantiating a pool of secondary VM instances based on the number of secondary VM instances required to maintain availability of the individual service instances;

identifying, by the data processing hardware, unavailability of one of the primary VM instances in the pool of primary VM instances;

causing, by the data processing hardware, the unavailable primary VM instance to failover to one of the secondary VM instances in the pool of secondary VM instances to commence executing the individual service instance associated with the unavailable primary VM instance; and after the failover to the secondary VM instances:
determining, by the data processing hardware, that the secondary VM instances comprises a corresponding resource level that is less than a target resource level associated with the corresponding individual service instance; and during execution of the individual service instance by the secondary VM instances, growing, by the data processing hardware, the corresponding resource level of the secondary VM instances until the target resource level associated with the individual service instance is satisfied.

15. The system of claim 14, wherein a number of secondary VM instances in the pool of secondary VM instances is less than the number of primary VM instances in the pool of primary VM instances.

16. The system of claim 14, wherein the operations further comprise updating the number of secondary VM instances required to maintain availability of the individual service instances when the number of primary VM instances executing in the pool changes.

17. The system of claim 14, wherein unavailability of a primary VM instance is based on at least one of a failure of the primary VM instance, a delay in re-creating the primary VM instance, or a planned maintenance time period for the primary VM instance.

18. The system of claim 14, wherein the rate of unavailability comprises at least one of a frequency of unavailability or a period of unavailability.

19. The system of claim 14, wherein the operations further comprise determining the rate of unavailability for each primary VM instance in the pool of primary VM instances based on a mean-time-to-failure (MTTF) and an expected length of time to re-create the corresponding primary VM instance.

20. The system of claim 14, wherein each secondary VM instances in the pool of secondary VM instances is passive and idle unless a failover causes the corresponding secondary VM instances to commence executing an individual service instance associated with an unavailable primary VM instance in the pool of primary VM instances.

21. The system of claim 14, wherein instantiating the pool of secondary VM instances comprises:
determining a corresponding VM type for each primary VM instance in the pool of primary VM instances; and
for each different VM type in the pool of primary VM instances, instantiating at least one secondary VM instances having the same VM type.

22. The system of claim 21, wherein the corresponding VM type for each primary VM instance indicates at least one of memory resource requirements, computing resource requirements, network specification requirements, or local storage requirements for the corresponding primary VM instance.

23. The system of claim 14, wherein the pool of secondary VM instances are instantiated for use by a single customer of the distributed system.

24. The system of claim 14, wherein the pool of secondary VM instances are shared among multiple customers of the distributed system.

25. The system of claim 14, wherein the operations further comprise:
receiving a planned failover message indicating a number of primary VM instances in the pool of primary VM instances that will be unavailable during a planned maintenance time period,
wherein instantiating the pool of secondary VM instances is further based on the number of primary VM instances that will be unavailable during the planned maintenance time period.

26. The system of claim 25, wherein instantiating the pool of secondary VM instances comprises instantiating a number of secondary VM instances equal to the greater one of:
the number of secondary VM instances required to maintain availability of the individual service instances; or
the number of primary VM instances that will be unavailable during the planned maintenance time period.

* * * * *